United States Patent [19]

Schwinghammer

[11] 4,201,674
[45] May 6, 1980

[54] APPARATUS FOR CLEANING PLATE-TYPE FILTER ELEMENTS LOCATED IN A TANK FILTER

[75] Inventor: Günther Schwinghammer, Dortmund, Fed. Rep. of Germany

[73] Assignee: Holstein und Kappert GmbH, Dortmund, Fed. Rep. of Germany

[21] Appl. No.: 963,752

[22] Filed: Nov. 27, 1978

[30] Foreign Application Priority Data

Nov. 26, 1977 [DE] Fed. Rep. of Germany ....... 2752906

[51] Int. Cl.² ........................ B01D 35/16; B01D 41/04
[52] U.S. Cl. .................................. 210/333 R; 210/393; 210/411
[58] Field of Search .................... 210/79, 81, 82, 106, 210/108, 198 R, 322, 323 T, 333 R, 333 A, 391, 393, 409, 411, 232, 234; 134/113, 166 R, 167 R, 168 R, 169 R, 169 A, 172, 199; 55/302, 294

[56] References Cited

U.S. PATENT DOCUMENTS 3,820,552  6/1974  Lang et al. ........................... 210/409

*Primary Examiner*—Frank Sever
*Attorney, Agent, or Firm*—Toren, McGeady and Stanger

[57] ABSTRACT

In cleaning plate-type filter elements in a tank filter, the tank is opened and a cleaning tube is placed upwardly around one of the downwardly extending filter elements providing an annular flow space along the length of the element. A seal member is located in the upper end of the cleaning tube to close off the upper end of the annular flow space. Pressurized cleaning fluid is supplied into the lower end of the tube where it flows upwardly through the annular space and then into the filter element to dislodge any contamination. The material displaced continues its flow through the filter element in the same direction as is taken by the fluid being filtered.

7 Claims, 5 Drawing Figures

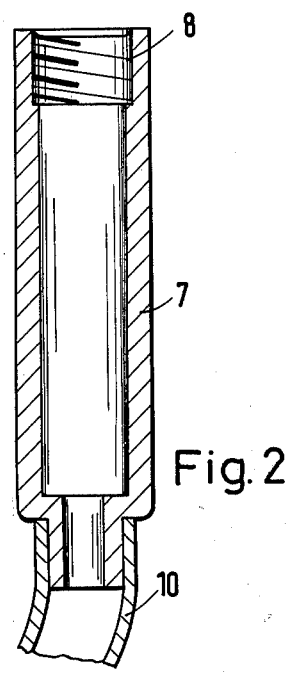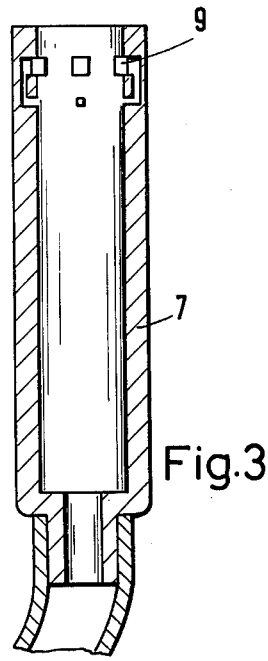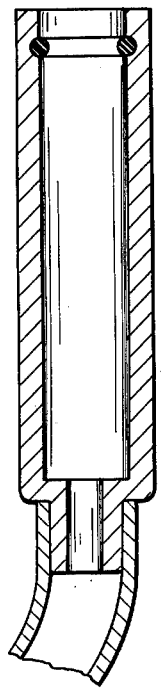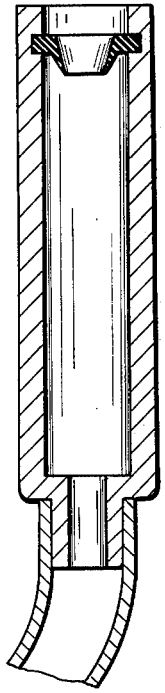

4,201,674

APPARATUS FOR CLEANING PLATE-TYPE FILTER ELEMENTS LOCATED IN A TANK FILTER

SUMMARY OF THE INVENTION

The invention is directed to a method of and apparatus for cleaning plate-type filter elements located within a tank filter.

Cleaning of tank filters after a daily filtration operation is particularly important, since the filters are generally not opened for a longer period of time. Only a safe method which adequately cleans the filters so that a satisfactory deposition is obtained on a daily basis guarantees excellent filtration quality. Nevertheless, due to improper handling, over a period of time, a certain contamination of the microfine slots of individual plate-type filter elements may occur resulting in the obstruction of flow and in a non-uniform deposition.

After daily usage at the latest, it is necessary to disassemble the individual filter elements made up of a plurality of discs stacked one on top of the other and forming the microfine slots when the discs are pressed together. Due to the large number of filter elements in a tank filter, this cleaning procedure is both time-consuming and cumbersome.

Therefore, the primary object of the present invention is to provide a method of and apparatus for cleaning plate-type filter elements within a tank filter where the filter elements or sections of the elements in the assembled state can be freed of any difficult-to-remove residues by flowing a pressurized fluid from the exterior into the elements in the direction of the filtration path.

In accordance with the present invention, the plate-type filter elements are cleaned in the assembled state from the outside toward the inside in the direction of the flow of the filtrate. To carry out the cleaning operation, the bottom of the chamber for the unfiltered liquid is opened and a cleaning tube is guided either for a partial or total axial length of the filter element from the bottom toward the top so that the cleaning tube forms, in combination with the filter elements, a chamber into which the pressurized cleaning fluid is introduced through a connection at the lower end of the cleaning tube. The cleaning fluid flows into an annular gap or space between the inside surface of the cleaning tube and the outside of the plate-type filter elements.

Further, the apparatus used in carrying out the method of the present invention includes a tank filter divided by a horizontally arranged sheet into an upper filtrate chamber and a lower chamber for the unfiltered liquid with the filter elements projecting downwardly from the sheet into the lower chamber. The tank filter is distinguished over what has been done in the past by the fact that the lower chamber can be opened and a cleaning tube which has a locking device and/or a sealing element on its upper end can be placed over and in interconnection with the filter element. At its lower end, the cleaning tube has a connection through which the cleaning agent or fluid is introduced for flow upwardly through the cleaning tube and then inwardly into the filter element.

In one embodiment, it has been found advantageous to secure the locking elements on the cleaning tube into a groove on the filter element.

In another embodiment of the present invention, the cleaning tube is screwed onto the filter element.

In still another embodiment it has proven to be especially advantageous that the locking and/or sealing elements can be secured to the filter element by the pressure developed within the cleaning tube by the cleaning fluid so that practically any section of the filter element can be cleaned.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 2 is an axially extending cross-sectional view of one embodiment of a cleaning tube usable in cleaning the tank filter of FIG. 1; and FIGS. 3 to 5 show three other embodiments of a cleaning tube arranged to be sealed to a filter element.

DETAILED DESCRIPTION OF THE INVENTION

Figure 1:
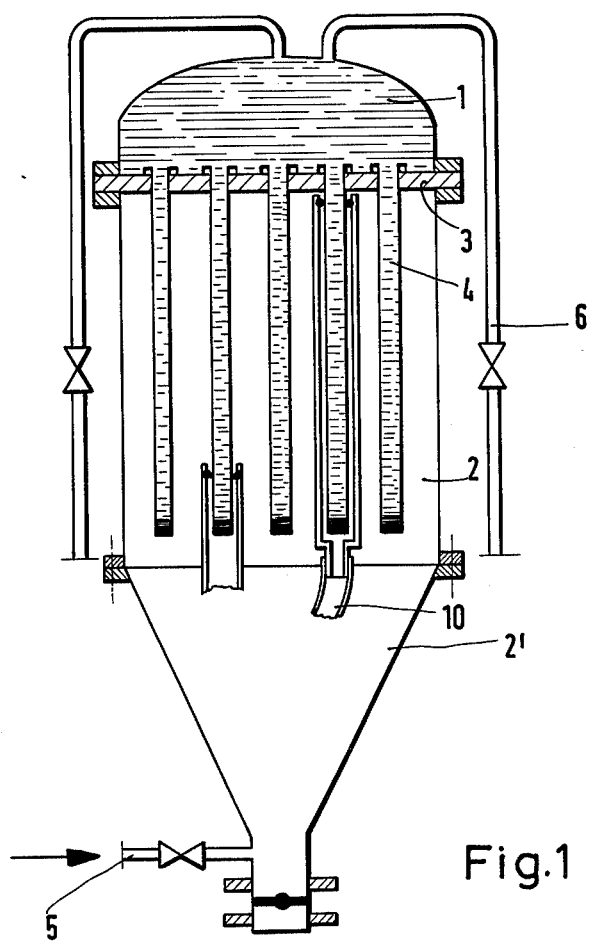
FIG. 1 is a schematic sectional view through a tank filter illustrating the present invention.

In FIG. 1 a tank filter is shown divided into an upper hood-shaped filtrate chamber 1 and lower unfiltered liquid chamber 2 by a generally horizontally arranged intermediate sheet 3. Lower chamber 2 consists of an upper cylindrically shaped portion and a lower conically shaped portion 2' with the downwardly extending surfaces of the lower portion 2' converging inwardly in the downward direction. Intermediate sheet 3 dividing the tank filter into the two separate chambers 1,2-2', has a number of bores in which back-washable filter elements extend downwardly through the sheet from the upper chamber 1 into the upper portion of the lower chamber 2-2'. At its lower end, the lower portion 2' of the lower chamber has a connecting piece with a distributor ring connected to a supply line 5 for introducing unfiltered liquid. Outlet lines 6 for the filtrate are connected to the upper portion of the upper chamber 1.

In carrying out the cleaning operation, the lower portion 2' of the unfiltered liquid chamber 2 can be displaced laterally so that the individual filter elements 4 are accessible at their lower ends. These filter elements 4 have threaded bushings at their upper ends which project through the intermediate sheet 3 into the lower chamber 2. The bushings at the upper ends have a thread and/or a circumferential groove suitable for connecting a cleaning tube 7 to the filter element 4. Note in FIG. 2 the upper end of the cleaning tube 7 has an internal thread 8 while in FIG. 3 the upper end of the tube has locking elements 9 which can be pressed mechanically or through the application of pressure into a corresponding groove in the filter element. At their lower ends, the cleaning tubes are provided with a hose connection 10 for introducing a cleaning agent or fluid into the tube.

In carrying out the cleaning operation with the filter elements 4 in the assembled state, the lower portion 2' of the lower chamber 2 is displaced laterally and a cleaning tube 7 is placed over one of the filter elements 4 sliding it upwardly from the bottom of the element and, if appropriate, the cleaning tube is locked in place about the plate-type filter element. After the cleaning tube 7 has been securely mounted about the filter element 4, the cleaning fluid is supplied through the hose connection 10 at the lower end of the tube at an increased pressure, for example, 4 atmospheres absolute. The cleaning fluid flows in the direction of filtrate flow upwardly in the annular space between the tube and the filter element passing through the microfine slots between the individual discs of the filter element so that even stubborn contamination is removed and washed out in the direction of filtrate flow into the upper chamber 1. By laterally enclosing the filter element 4 with the cleaning tube 7 during the cleaning operation, it is unnecessary to disassemble the individual filter elements 4 or to provide any manual cleaning of the individual filter discs.

As can be seen in FIG. 1, one cleaning tube 7 extends for the axial length of the filter element it encloses up to the underside of the intermediate sheet 3. Another cleaning tube 7 is shown extending for a short distance upwardly about another one of the filter elements 4. In FIGS. 4 and 5 cleaning tubes are shown for use in partial cleaning of the individual filter elements 4 or for cleaning contaminated sections of the elements. Adjacent their upper ends, the cleaning tubes shown in FIGS. 4 and 5 have sealing elements which provide a tight sealing contact with the filter elements 4. In particular, the elastically deformable sealing element shown in FIG. 5 is pressed against the surface of the filter element when pressure is applied within the interior of the cleaning tube, that is, in the space between the tube and the filter element. With this sealing element, the surface quality of the outside surface of the filter element is of secondary importance. By using cleaning tubes constructed in this manner, a partial section or the full length of a filter element can be satisfactorily cleaned. Cleaning individual sections of the filter elements is particularly preferred. Cleaning a portion or the full axial length of a filter element 4 is indicated by the two separate cleaning tubes shown in FIG. 1.

What is claimed is:

1. Device for cleaning plate-type filter elements made up of a plurality of discs stacked one on top of the other and forming the microfine slots when the discs are pressed together, comprising a tank forming an enclosed open space, a sheet extending generally horizontally across said tank and dividing the open space therein into an upper filtrate chamber and a lower unfiltered liquid chamber, a plurality of laterally spaced generally vertically extending plate-type filter elements extending downwardly from and through said sheet into said lower chamber with the lower ends of said filter elements spaced downwardly from said sheet, wherein the improvement comprises a cleaning tube insertable over one said filter element from the lower end thereof and positionable relative to the one said filter element for laterally enclosing a vertically extending portion thereof from the lower end of said element, said tube spaced radially outwardly from the surface of said element forming a vertically extending annular open space therebetween with the radially outer surface of the annular open space being formed by said cleaning tube and the radially inner surface of the annular open space being formed by said filter element, a connection to the lower end of said cleaning tube for supplying a pressurized cleaning fluid thereto for flow upwardly through said cleaning tube directly into the annular open space radially outwardly of said element so that the pressure of the cleaning fluid acts over the entire surface of said filter element laterally enclosed by said cleaning tube, and means circumferentially disposed at the upper portion of said cleaning tube for providing a fluid-tight seal between said cleaning tube adjacent the upper end thereof and said filter element enclosed by said cleaning tube.

2. Device, as set forth in claim 1, wherein said means for providing a seal comprises a thread formed on the one said filter element and a corresponding thread formed in said cleaning tube adjacent the upper end thereof for providing a threaded sealed interconnection therebetween.

3. Device, as set forth in claim 1, wherein said means for providing a seal comprises a groove formed in said filter element and locking elements formed on and projecting inwardly from said cleaning tube into said groove for providing a sealed interconnection therebetween.

4. Device, as set forth in claim 1, wherein said means for providing a seal comprises an elastically deformable member located within said cleaning tube and being deformable under the pressure of the cleaning fluid for effecting the sealing action between said cleaning tube and the one said filter element.

5. Device, as set forth in claim 1, wherein the portion of said tank forming said lower unfiltered chamber comprises a cylindrically shaped upper portion extending downwardly from said sheet and a lower section extending downwardly from the lower end of said upper section, said lower section being displaceable from said upper section for affording access to the lower end of the one said filter element for placing said cleaning tube thereover.

6. Device, as set forth in claim 5, wherein said lower section is frusto-conically shaped with the surface thereof converging inwardly in the direction downwardly from said upper section.

7. Device, as set forth in claim 5, wherein outlet means are connected to the upper filtrate chamber for removing the filtered liquid, and inlet means connected to the lower section of said lower chamber for supplying unfiltered liquid into the lower chamber.

* * * * *